MODULATION OR GAIN CONTROL SYSTEM AND METHOD

Filed April 22, 1955

INVENTOR.
Howard M. Scott
BY J. C. Whittaker
ATTORNEY

United States Patent Office 2,883,626

Patented Apr. 21, 1959

2,883,626

MODULATION OR GAIN CONTROL SYSTEM AND METHOD

Howard M. Scott, Philadelphia, Pa., assignor to Radio Corporation of America, a corporation of Delaware Application April 22, 1955, Serial No. 503,273

The terminal fifteen years of the term of the patent to be granted has been disclaimed 4 Claims. (Cl. 332—49)

The invention relates to improved modulation or gain control systems and methods and, more particularly, to such systems and methods wherein a cancellation technique is utilized to prevent modulation of the base line of the modulated or controlled signal.

The storage characteristic of "Graphechon" storage tubes varies radially with distance from the center of the target area, the storage sensitivity characteristic being higher at and near the center of the target area. For example, if writing is performed by means of a plan-position-indicator (P.P.I.)-type scan and video signals of constant amplitude are written along a single sweep line, upon reading out the signals stored along this same sweep line, it is found that the storage decreases in amplitude as the peripheral portion of the target area is approached. (A description of such storage tubes is available in an article entitled "The Graphechon—A Picture Storage Tube," by L. Pensak, published in the RCA Review, vol. X, No. 1, March 1949, on pp. 59–73.)

One remedy for this decrease in storage is to amplify the video signals applied to the writing beam of the "Graphechon" so that those applied near the outer end of a sweep line have greater amplitude than those applied near the inner end. Thus the amplitude of the applied writing signals is varied complementarily with the radial decrease in storage sensitivity.

An object of this invention is to provide an improved signal modulation device and method.

Another object is to provide an improved method of and means for modulating the amplitude of an input signal without simultaneously modulating its base line.

A further object is to provide an improved gain control system and method which is adapted to compensate for the variation with distance from the center of the target area of the storage characteristic of certain storage tubes such as the "Graphechon."

Yet another object is to provide an improved modulation device and method which provides a gated, modulated output signal having a constant base line.

The foregoing objects and advantages of the present invention are accomplished in a typical embodiment by employing a cancellation technique to maintain the plate current of a multigrid electron tube at a constant value while varying its mutual conductance by means of a modulating or gain control signal.

The modulating signal is applied to the suppressor grid of a pentode and an amount of the modulating signal sufficient to maintain the plate current of the tube at a constant value, for constant control grid potential, is applied in opposite polarity to the screen grid.

If an input signal voltage of constant peak-amplitude and single polarity is now applied to the control grid of the pentode, it appears at the anode as a signal modulated in amplitude in accordance with the changing mutual conductance of the tube. However, the modulation envelope varies on only one side of the output signal; the other side has a constant, unmodulated base line. The use of such a modulation or gain-control system is not limited to the specific radar application described heretofore, but may be utilized to advantage whenever it is desired to vary a signal magnitude in a similar manner.

The invention will be described in greater detail with reference to the accompanying drawing in which similar reference characters apply to similar elements, and in which.

Figure 1:
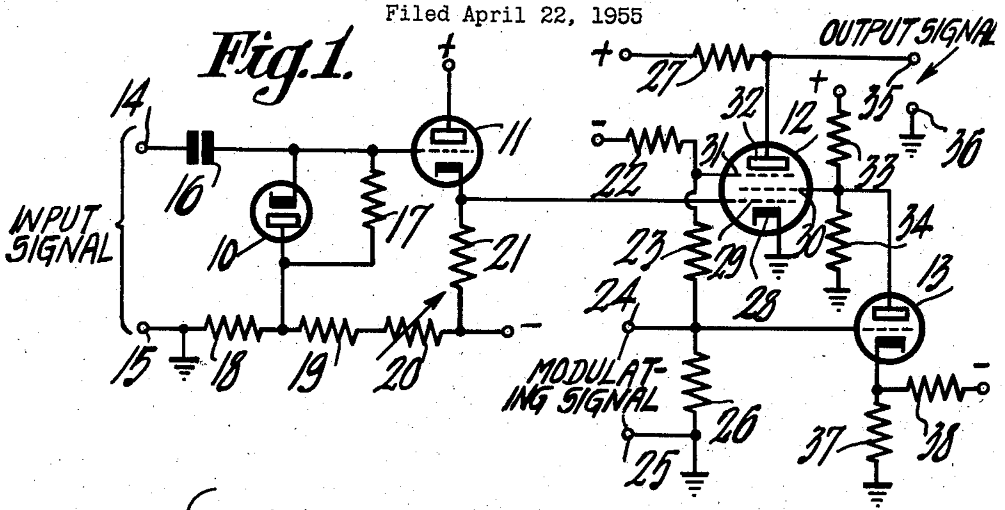
Figure 1 is a schematic circuit diagram of a typical embodiment of the invention.

Referring to Figure 1, an input terminal 14 is coupled through a coupling capacitor 16 to the control grid of a triode 11 functioning as a cathode follower. The negative bias voltage on the control grid of the cathode follower 11 is supplied by means of a series voltage divider network comprising fixed resistors 18 and 19 and variable resistor 20, said network extending from the negative source of supply voltage to ground. Negative bias is impressed on the control grid from the junction between the two fixed resistors 18 and 19 through a clamp circuit comprising a rectifier 10, which may be a diode, and a parallel resistor 17.

The anode of the cathode follower 11 is connected directly to the positive source of supply voltage and the cathode is connected to the negative supply voltage source through a fixed resistor 21. The cathode is also directly coupled to the control grid 29 of the modulation tube 12, a variable-gain, multi-element, electron tube having at least three grids 29, 30, and 31. The bias voltage on the control grid 29 of the modulation tube 12 is controlled by adjusting the value of the variable resistor 20 as will be explained more fully below.

The suppressor grid 31 of the modulation tube 12 receives its bias voltage from a tap on a series voltage divider network comprising three fixed resistors 22, 23, and 26, extending in that order from the negative supply voltage source to ground. Input terminals for a modulating signal are coupled across the modulating signal resistor 26, the resistor in the voltage divider network which is connected to ground.

The high potential end of the modulating signal resistor 26 is also coupled to the control grid of the cancellation tube 13, which may be a triode electron tube. The cathode of the cancellation tube 13 is coupled to the junction of two series resistors 37 and 38 which extend from the negative supply voltage source to ground. These series resistors 37 and 38, in conjunction with the bias voltage impressed on the control grid of the cancellation tube 13 by the connection to the modulating signal resistor 26, act to properly bias the cancellation tube 13. The anode of the cancellation tube 13 is connected directly to the screen grid 30 of the modulation tube 12 and to the positive source of supply voltage through a fixed resistor 33. A fixed resistor 34 extends from the screen grid 30 of the modulation tube 12 to ground.

In operation, the bias voltage on the control grid 29 of the modulation tube 12 is regulated by adjusting the value of the variable resistor 20. This also regulates the value of potential at the anode and cathode of the clamping diode 10, and the static grid potential of the cathode follower 11. Fixing the static grid potential of the cathode follower 11 determines the amount of static plate current which flows and hence the potential at the cathode. The potential at the cathode of the cathode follower 11 is impressed as a biasing voltage upon the first control grid 29 of the modulation tube 12.

The operation of the circuit will be described in relation to such operating conditions and such types of input signal and modulating signal as may be utilized when radar target echoes are written by means of a P.P.I.-type scan upon a Graphechon storage tube.

An input signal (see Figure 2A), which is illustrated as a series of positive video pulses (although other types of input signals may be employed) is impressed upon the control grid of the cathode follower 11. The clamping diode 10 clamps the input signals to a level determined by the relative values of resistors 18–20 and the amplitude of the negative direct voltage applied across this network. A duplicate of the input signal waveform appears across the cathode resistor 21 of the cathode follower 11 and is applied to the control grid of the modulation tube 12.

Figure 3:
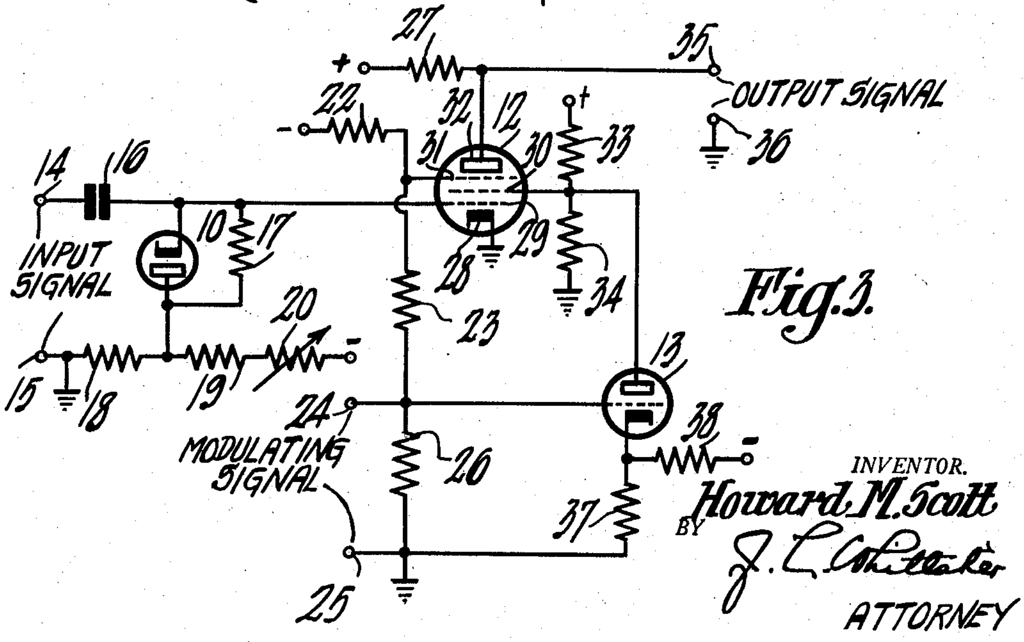
Figure 3 is a schematic circuit diagram of another embodiment of the invention.

In an embodiment of this invention constructed, a 6AS6 tube was employed as a modulation tube 12. The characteristics of the 6AS6 are such that it was found preferable to drive it from a low impedance source. For this reason, the cathode follower 11 was employed, as shown in Figure 1. It is to be understood, however, that when tubes having other characteristics are employed, the cathode follower 11 may be eliminated and the circuit then appears as illustrated in Figure 3, although the values of the fixed resistors 18 and 19 and the variable resistor 20 may be different.

Figure 2:
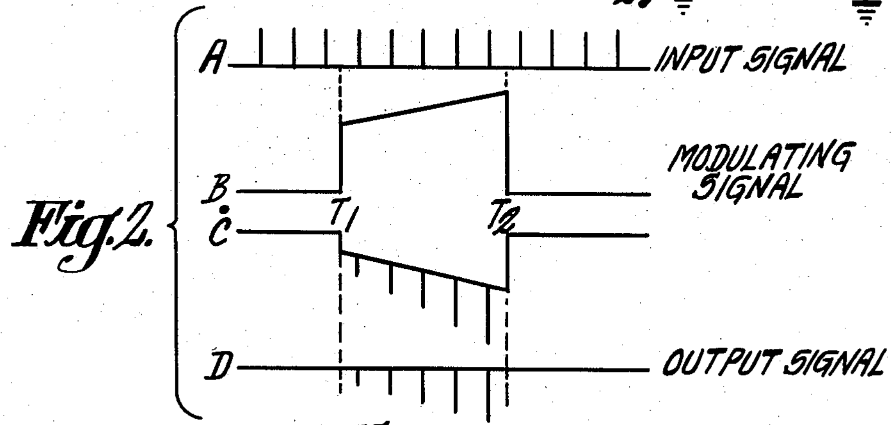
Figure 2 is a series of waveforms helpful in explaining the operation of the invention.

A modulating signal (see Figure 2B), which may be a trapezoidal pulse (or a signal of other shape) is then impressed across the modulating signal resistor 26 and thence applied through series resistor 23 to suppressor grid 31 of the modulation tube 12. The initial positive rise of the trapezoid at $T_1$ is just sufficient to cause the modulation tube 12 to begin to conduct plate current by overcoming the negative bias applied to the suppressor grid 31 by the voltage divider network resistors 22, 23, and 26. One would normally expect the application of a sawtooth pedestal waveform on the suppressor grid 31 to increase both the mutual conductance and the plate current of the modulation tube 12. The output signal in such case is the sum of the input signal and the modulating signal (as long as the tube is operated on the linear portion of its characteristic) as shown in Figure 2C. This results in an output signal in which both sides of the modulation envelope vary in accordance with the modulating signal.

According to the present invention, the modulating signal is applied to the control grid of a cancellation tube 13 and the inverted modulating signal which appears at the anode is impressed on the screen grid 30 of the modulation tube 12. The net effect is cancellation of the plate current variations which would ordinarily result from application of the modulating signal to the suppressor grid 31 without affecting the change in the mutual conductance of the modulation tube 12 caused by the sawtooth section of the modulating signal between $T_1$ and $T_2$.

This result is obtained by applying to the screen grid 30 of the modulation tube 12 the inverted modulating signal with sufficient amplitude to exactly compensate for changes in plate current caused by the modulating signal on the suppressor grid 31. However, even though there is now no change in plate current in the absence of an input signal to the control grid 29, the positive rise in voltage on the suppressor grid 31 during the interval from $T_1$ to $T_2$ causes an increase in the mutual conductance, or gain, of the modulating tube. The plate current now varies only when the input signal on the control grid 29 of the modulation tube 12 varies. The output signal in response to a plurality of positive input pulses during the interval $T_1$–$T_2$ is a series of negative pulses increasing in amplitude from $T_1$ to $T_2$ and arising from an unmodulated base line as shown in Figure 2D. The reason that the base line of the input signal remains unmodulated is that the plate current changes which would be caused by the modulating signal are cancelled by application of the inverted modulating signal.

It is to be noted that the input signal is a signal of positive polarity. In application where the input signal is of negative polarity, an inverting amplifier may be inserted prior to the input terminals 14 and 15 of the invention.

A typical circuit in accordance with this invention, as shown in Figure 1, may employ the following components:

10—½ of an RCA type 6AL5 tube
11—½ of an RCA type 5670 tube
12—an RCA type 6AS6 tube
13—½ of an RCA type 5670 tube
16—.5 μf. capacitor
17—1 megohm resistor
18—6,800 ohms resistor
19—120,000 ohms resistor
20—50,000 ohms resistor
21—27,000 ohms resistor
22—33,000 ohms resistor
23—1,200 ohms resistor
26—6,800 ohms resistor
27—2,200 ohms resistor
33—2,200 ohms resistor
34—12,000 ohms resistor
37—1,000 ohms resistor
38—15,000 ohms resistor The circuit described will pass video frequencies from 60 cycles to about five megacycles per second; either continuous modulating signals or pulsed modulating signals having a duration as short as six microseconds can be employed; the output signal amplitude can be varied as much as ten to one for a given constant input signal of 1 volt to 4 volts peak-to-peak; and the minimum time allowable between pulsed modulating signals is limited by the frequency response of tube 13 and its associated anode load.

What is claimed is:

1. A modulating system comprising, in combination, a pentode including an anode, cathode, control grid, screen grid and suppressor grid; means coupled to said pentode for applying operating voltages thereto in a sense and amplitude to permit the current conducted thereby to vary with a signal applied to said control grid; means for applying a modulating signal to said suppressor grid, said modulating signal tending to change the amount of current drawn by said pentode in the absence of a signal applied to its control grid; and means for inverting said modulating signal and applying it to said screen grid at a level of amplitude such that the current drawn by said pentode changes when a positive-going signal is applied to said control grid but is prevented from changing in the absence of a positive-going signal applied to said control grid.

2. A modulating system as set forth in claim 1, wherein said means for inverting said modulating signals comprises a triode.

3. A modulating system as set forth in claim 1, further including clamping means coupled to said control grid for clamping the latter to a predetermined voltage level.

4. A modulating system comprising, in combination, a pentode having a control grid, screen grid, and suppressor grid, said pentode conducting a current which varies with variations in a signal applied to its control grid; means for applying a positive-going saw tooth wave to said suppressor grid coincidentally with the application of spaced pulses to said control grid; and means for inverting and amplifying said saw tooth wave and applying a sufficient portion of the inverted wave to said screen grid to prevent said pentode from changing the amount of current it conducts in the absence of a positive-going signal applied to said control grid.

References Cited in the file of this patent

UNITED STATES PATENTS

| | | |
|---|---|---|
| 2,095,371 | Rohnfeld | Oct. 12, 1937 |
| 2,103,869 | Peterson et al. | Dec. 28, 1937 |
| 2,504,469 | Tillman | Apr. 18, 1950 |
| 2,518,013 | Houghton | Aug. 8, 1950 |
| 2,572,016 | Elbourn | Oct. 23, 1951 |
| 2,600,873 | Holloway | June 17, 1952 |
| 2,680,153 | Boothroyd et al. | June 1, 1954 |